US007793204B2

(12) United States Patent
Carlson et al.

(10) Patent No.: US 7,793,204 B2
(45) Date of Patent: Sep. 7, 2010

(54) COPY PROTECTING DOCUMENTS

(75) Inventors: Gerard J. Carlson, Boise, ID (US); Vincent C. Skurdal, Boise, ID (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1338 days.

(21) Appl. No.: 10/387,612

(22) Filed: Mar. 13, 2003

(65) Prior Publication Data
US 2005/0034069 A1 Feb. 10, 2005

(51) Int. Cl.
G06F 17/00 (2006.01)
(52) U.S. Cl. .................... 715/200; 715/255
(58) Field of Classification Search ............ 715/530, 715/255, 200; 358/3.28; 283/93; 713/176; 380/202; 705/58
See application file for complete search history.

(56) References Cited

U.S. PATENT DOCUMENTS

| | | | |
|---|---|---|---|
| 5,018,767 A | | 5/1991 | Wicker |
| 5,487,567 A | * | 1/1996 | Volpe ..................... 283/72 |
| 5,606,609 A | * | 2/1997 | Houser et al. ............ 713/179 |
| 5,699,427 A | * | 12/1997 | Chow et al. .............. 705/58 |
| 5,707,083 A | | 1/1998 | Wallace |
| 5,735,547 A | | 4/1998 | Morelle et al. |
| 5,785,353 A | * | 7/1998 | Diamond ................. 283/67 |
| 5,788,285 A | | 8/1998 | Wicker |
| 5,830,609 A | * | 11/1998 | Warner et al. ........... 430/10 |
| 5,949,885 A | * | 9/1999 | Leighton ................ 380/54 |
| 5,958,005 A | * | 9/1999 | Thorne et al. ........... 709/202 |
| 6,131,162 A | * | 10/2000 | Yoshiura et al. .......... 713/176 |
| 6,139,066 A | | 10/2000 | Mowry, Jr. et al. |
| 6,185,684 B1 | * | 2/2001 | Pravetz et al. ........... 713/182 |
| 6,414,757 B1 | | 7/2002 | Salem |
| 7,117,370 B2 | * | 10/2006 | Khan et al. ............. 713/186 |
| 2001/0034835 A1 | * | 10/2001 | Smith .................... 713/175 |
| 2002/0067828 A1 | * | 6/2002 | Sparks et al. ............ 380/54 |
| 2002/0080959 A1 | * | 6/2002 | Weller ................... 380/55 |
| 2003/0016842 A1 | * | 1/2003 | Patton et al. ............ 382/100 |
| 2003/0154381 A1 | * | 8/2003 | Ouye et al. ............. 713/182 |
| 2004/0021549 A1 | * | 2/2004 | Choi et al. .............. 340/5.8 |
| 2004/0080777 A1 | * | 4/2004 | Smith .................... 358/1.14 |

FOREIGN PATENT DOCUMENTS

WO  WO 2004/033229  4/2004
WO  WO 2004/068421  8/2004

* cited by examiner

Primary Examiner—Stephen S Hong
Assistant Examiner—Manglesh M Patel
(74) Attorney, Agent, or Firm—Nathan R. Rieth

(57) ABSTRACT

Copy-protected documents are generated for intended recipients by integrating a document, each recipient name on a recipient list, and a security template into distinct copy-protected documents.

10 Claims, 8 Drawing Sheets

212

DOCUMENT

Lorem ipsum dolor sit amet, consectetuer adipiscing elit. Ut ut nulla. Nullam ut pede imperdiet odio tincidunt malesuada. Aliquam varius turpis in tortor. Nunc non eros lobortis dui sagittis fringilla. Curabitur a diam. Integer feugiat elit in orci. Etiam quis purus vel urna pretium placerat. Vivamus sed purus. Aliquam id magna et dolor porttitor cursus. Pellentesque habitant morbi tristique senectus et netus et malesuada fames ac turpis egestas. Maecenas consectetuer massa quis pede. Duis odio justo, suscipit at, dictum et, auctor a, felis. Donec aliquet. Integer nunc ante, scelerisque sit amet, mattis vitae, dignissim nec, dolor. Vestibulum id eros vitae ligula fermentum bibendum. Vestibulum metus turpis, bibendum quis, semper sit amet, pharetra sit amet, arcu. Nullam purus. Cras nec purus. Proin porta. Morbi nulla.

Cras vestibulum tincidunt justo. Phasellus imperdiet placerat ipsum. Morbi tortor. Nam pretium, mi vel tempor tincidunt, ipsum urna vestibulum velit, non dignissim magna magna nec leo. Aliquam porta vestibulum sem. Vestibulum laoreet bibendum ligula. Suspendisse eget elit. Cras diam mauris, pharetra et, pulvinar quis, suscipit vel, augue. Etiam ut ante ac erat hendrerit lobortis. Suspendisse aliquet. Nam at dui et massa dictum sagittis. Phasellus id magna. Nunc auctor lorem sit amet risus. Suspendisse mattis, diam nec aliquam sodales, lorem mi pellentesque lectus, sed hendrerit tellus lacus rutrum leo. Mauris varius mollis lectus. Praesent faucibus molestie sem. Pellentesque eleifend, nisl ac sollicitudin volutpat, libero nisl gravida velit, ut convallis sapien leo ac ligula. Praesent dictum mauris eu sapien. Duis eget ipsum.

Aliquam aliquet vestibulum nibh. Nullam massa. Phasellus eget pede sit amet urna mollis varius. Fusce non sem. Nullam dapibus pretium lacus. Quisque mi nisl, vestibulum ac, dapibus sollicitudin, convallis sed, enim. Pellentesque habitant morbi tristique senectus et netus et malesuada fames ac turpis egestas. Vestibulum ante ipsum primis in faucibus orci luctus et ultrices posuere cubilia Curae; Suspendisse potenti. Vestibulum accumsan. Proin convallis.

Pellentesque habitant morbi tristique senectus et netus et malesuada fames ac turpis egestas. Proin imperdiet quam vel est. In hac habitasse platea dictumst. Donec sodales adipiscing mi. Curabitur sit amet lacus ac elit consectetuer vestibulum. In hac habitasse platea dictumst. Vivamus pharetra faucibus purus. Proin et metus in elit lacinia pellentesque. Pellentesque condimentum. Nunc condimentum porta mauris. Duis bibendum justo eu sem.

Aenean mattis augue tempor magna. Praesent vehicula vestibulum metus. Class aptent taciti sociosqu ad litora torquent per conubia nostra, per inceptos hymenaeos. Donec eleifend magna et metus. Ut libero. Aliquam et tortor. Nam aliquam lacus vel erat. Curabitur in quam. Phasellus vitae justo. Vestibulum metus. In gravida sodales lectus. Fusce quis ante a turpis scelerisque facilisis. Sed mauris. Aenean porttitor felis a neque.

DOCUMENT

Lorem ipsum dolor sit amet, consectetuer adipiscing elit. Ut ~~~~~~~~~~~~~~~ullam ut pede imperdiet odio tincidunt malesuada. Aliquam varius ~~~~~~~~in tortor. Nunc non eros lobortis dui sagittis fringilla. Curabitur a diam~~~~~~~~~~giat elit in orci. Etiam quis purus vel urna pretium placerat. Vi~~~~~~~~d purus. Aliquam id magna et dolor porttitor cursus. Pellentesque habita~~~~~~~~~~~tique sene~~~~~~~~us et malesuada fames ac turpis egestas. Mae~~~~~~~~~ctetuer ma~~~~~~~~~ pede. Duis odio justo, suscipit at, dictum et, au~~~~~~~~~. Donec ali~~~~~~~~~ger nunc ante~~~~~~~~~e sit amet, mattis vitae, ~~~~~~~~~ nec, do~~~~~~~~~m id eros vi~~~~~~~~~mentum bibendum. Vestibulum metus turpis~~~~~~~endum qui~ s~~~~~~ amet, pharetra sit amet, arcu. Nullam purus. Cras nec purus. Pro~~ po~~. Morbi nulla.

Cras vestibulum tin~~~~~~~~sto. Phasellus imperdiet placerat ipsum. Morbi tortor. Nam pretium, mi vel tempor tincidunt, ipsum urna vestibulum velit, non dignissim magna magna nec leo. Aliquam porta vestibulum sem. Vestibulum laoreet bi~~~~~~~~n ligula. Suspendisse eget elit. Cras diam mauris, pharetra et, pulvinar~~~~~~~~it vel, augue. Etiam ut ante ac erat hendrerit lobortis. Suspendisse~~~~~~. Nam at dui et massa dictum sagittis. Phasellus id magna. Nunc auctor ~~~~~~~~~ risus. Suspendisse mattis, diam nec aliquam sodales, lorem mi p~~~~~~~~lectus, sed hendrerit tellus lacus rutrum leo. Mauris varius mollis lectus. ~~~~~~~faucibus m~~~~~~~ Pellentesque eleifend, nisl ac sollicitudin volu~~~~~~~ nisl gravi~~~~~~~convallis sap~~~~~eo ac ligula. Praesent dict~~~~~~~is eu sapien. ~~~~ipsum.

Aliquam aliquet vestibu~~~~~~h. Null~~ n~~~~Phasellus eget pede sit amet urna mollis varius. Fusce non sem. Nul~~~ d~~ibus pretium lacus. Quisque mi nisl, vestibulum ac, dapibus so~~~~~~~~~, convallis sed, enim. Pellentesque habitant morbi tristique senectus et ~~~~~~~malesuada fames ac turpis egestas. Vestibulum ante ipsum primis in faucibus orci luctus et ultrices posuere cubilia Curae; Suspendisse potenti. Vestibulum accumsan. Proin convallis.

Pellentesque habitant morbi tristique senectus ~~~~~~~~~malesuada fames ac turpis egestas. Proin imperdiet quam vel est. In h~~ ~~~~~~platea dictumst. Donec sodales adipiscing mi. Curabitur sit amet la~~~~~~it consectet~~~~~stibulum. In hac habitasse platea dictumst. Viva~~~~~~~~faucibus puru~~~~~~~metus in elit lacinia pellentesque. Pell~~~~~~~condimentum~~~~~~~condimentum n~~~~~mauris. Duis bibend~~~~~~~ sem.

Aenean mattis augue tempor magna. P~~~~~~~~icula vestibulum metus. Class aptent taciti sociosqu ad litora torquen~~~~ co~~bia nostra, per inceptos hymenaeos. Donec eleifend magna et m~~~~~~~libero. Aliquam et tortor. Nam aliquam lacus vel erat. Curabitur in quam. Phasellus vitae justo. Vestibulum metus. In gravida sodales lectus. Fusce quis ante a turpis scelerisque facilisis. Sed mauris. Aenean porttitor felis a neque.

*Fig. 8*

COPY PROTECTING DOCUMENTS

BACKGROUND

Photocopy fraud protection is an important issue for many businesses and government agencies. Methods for limiting the distribution and unauthorized photocopying of sensitive documents include printing a limited number of documents with each original document assigned to an intended recipient. Original documents may be sequentially numbered and bear the recipients' names on the title page or in the header or footer on each page of the document. Some disadvantages of such methods are that an original document can be photocopied without a title page and a strip of paper can be used to mask off header or footer information during photocopying.

Another method for limiting the distribution and unauthorized photocopying of sensitive documents includes printing such documents on pre-prepared, copy-protected print media (e.g., paper). Such media typically includes background information, such as a warning message, encoded or embedded into a security watermark that can be mostly unnoticeable to a casual observer. If a photocopy is made of such a document printed on copy-protected paper, however, the background information or security watermark becomes prominently displayed on the photocopy. Therefore, the warning message becomes noticeable to even a casual observer if the document is photocopied. Details of such security watermarks are well-known to those skilled in the art and can be found in, for example, U.S. Pat. No. 5,788,285 to Wicker, U.S. Pat. No. 6,139,066 to Mowry et al., and U.S. Pat. No. 6,414,757 to Salem.

Use of such pre-prepared, copy-protected paper in conventional printing devices can have disadvantages, however. For example, tracing an unauthorized photocopy back to a recipient of an original document is difficult if the recipient's name is not on the photocopy. Recipients may tend to take less care in managing such documents knowing that they will not be linked to unauthorized copies. Another disadvantage with this method is that a strip of paper can be used to mask off warnings in the header or footer during photocopying. Yet another disadvantage is that use of such copy-protected paper is labor-intensive. Each use of the paper requires that a printer be specially loaded with the paper and then unloaded when printing on the special paper is completed.

SUMMARY

Copy-protected documents are generated for intended recipients by integrating in a document, each recipient name on a recipient list, and a security template into distinct copy-protected documents.

BRIEF DESCRIPTION OF THE DRAWINGS

The same reference numbers are used throughout the drawings to reference like components and features.

FIG. 3 illustrates an example of a document used in generating a copy-protected document.

FIG. 7 illustrates an example of an original copy-protected document.

FIG. 8 illustrates a photocopy of the original copy-protected document of FIG. 7.

DETAILED DESCRIPTION

Overview

A security module is configured on a computer and/or a printer to offer a copy-protection option for generating copy-protected documents. The module integrates a document with a recipient list and a security watermark template in order to generate a distinct copy-protected document for each recipient in the recipient list. Each recipient's name is encoded into the background of the watermark template to form a unique security template that is combined with the document to form a distinct copy-protected document. The background information in each copy-protected document therefore contains a recipient's name generally combined with a security warning, in addition to an indication as to the number of original copy-protected documents being generated. There are as many distinct copy-protected documents generated as there are recipient names in the recipient list.

The background information in an original copy-protected document is indistinct and mostly unnoticeable to a casual observer. If a photocopy is made of a copy-protected document, however, the background information becomes prominently displayed on the photocopy. The name of the original document recipient and a warning are therefore noticeable to even a casual observer.

Exemplary Environment

Figure 1:
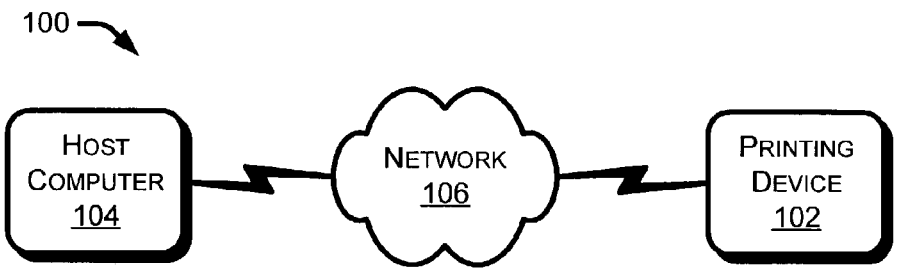
FIG. 1 illustrates an exemplary environment for implementing one or more embodiments of a system for generating copy-protected documents.

FIG. 1 illustrates an exemplary environment for implementing one or more embodiments of a system for generating copy-protected documents. The exemplary environment 100 of FIG. 1 includes a printing device 102 operatively coupled to a host computer 104 through a network 106. The network 106 can be a direct or indirect link and may include, for example, a printer cable, a LAN (local area networks), a WAN (wide area networks), an intranet, the Internet, or any other suitable communication link. Network 106 can also include a wireless communications link such as an IR (infrared) or RF (radio frequency) link.

Printing device 102 may be any of a wide variety of printing devices capable of rendering PDL (page description language) data, for example, in printed form on a print medium, such as printing pixels on paper. Therefore, printing device 102 can include devices such as laser-based printers, ink-based printers, plotters, multifunction peripheral devices and the like.

Host computer 104 can be implemented as a variety of general purpose computing devices including, for example, a desktop, laptop, or other forms of personal computers (PC), a server, a Web server, and other devices configured to communicate with printing device 102. Computer 104 is typically capable of performing common computing functions, such as emailing, calendaring, task organization, word processing, Web browsing, and so on. Thus, computer 104 provides a user with the ability to manipulate or otherwise prepare in electronic form, an image or document to be rendered as an image that is printed or otherwise formed onto a print medium by printing device 102 after transmission over network 106. In general, host computer 104 outputs host data to printing device 102 in a driver format suitable for the device 102, such as PCL or PostScript. Printing device 102 converts the host data and outputs it onto an appropriate recording media, such as paper or transparencies.

Exemplary Embodiments

Figure 2:
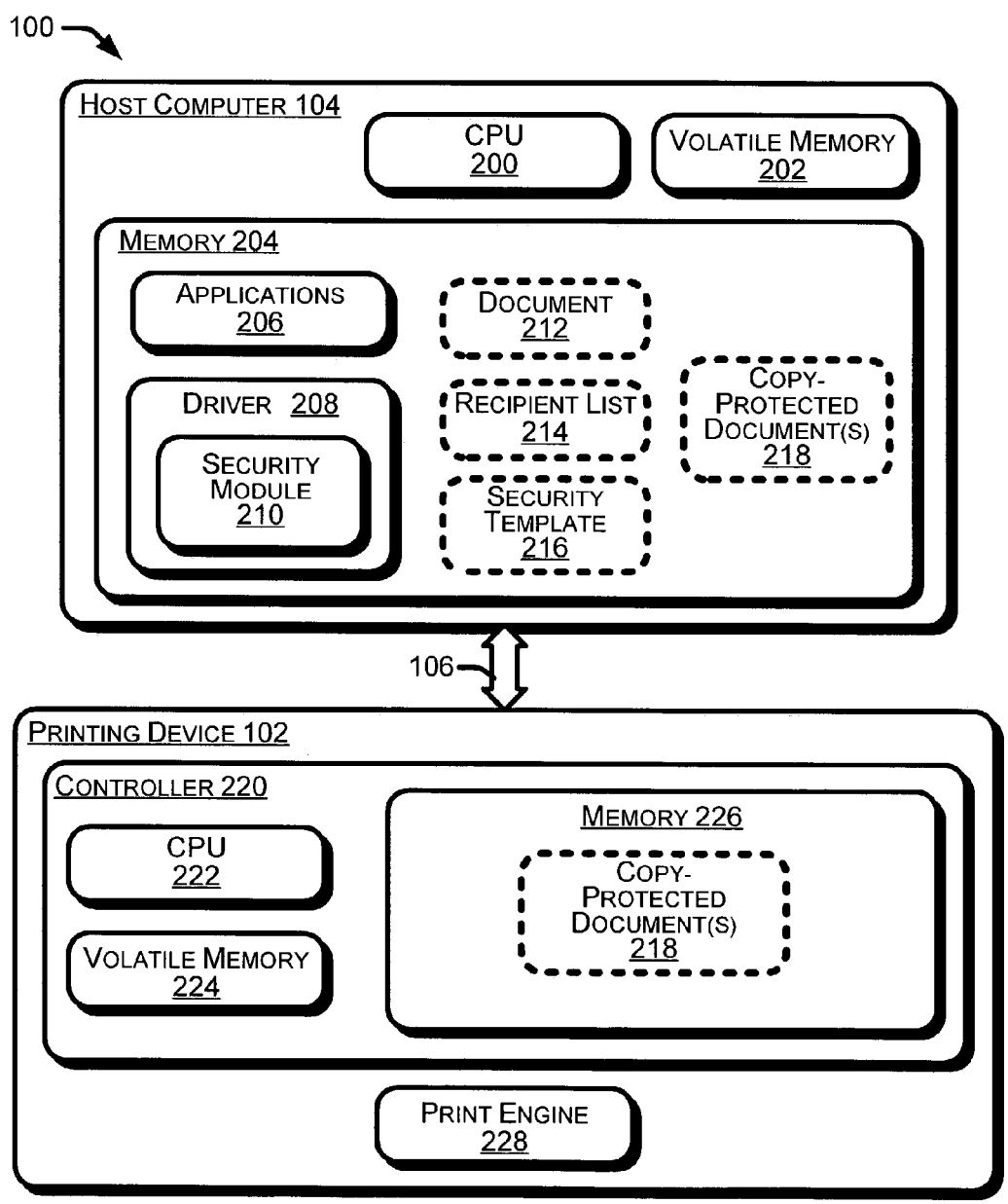
FIG. 2 illustrates a block diagram of an exemplary computer and an exemplary printer as might be implemented in the environment of FIG. 1.

FIG. 2 illustrates a block diagram of an exemplary computer 104 and an exemplary printer 102 as might be implemented to generate copy-protected documents in the environment 100 of FIG. 1. Computer 104 includes a processor 200, a volatile memory 202 (i.e., RAM), and a nonvolatile memory 204 (e.g., ROM, hard disk, floppy disk, CD-ROM, etc.). Nonvolatile memory 204 generally provides storage of computer/processor-readable instructions, data structures, program modules and other data for computer 104. Computer 104 typically implements various application programs 206 stored in memory 204 and executed on processor 200. Such applications 206 might include software programs implementing, for example, word processors, spread sheets, browsers, multimedia players, illustrators, computer-aided design tools and the like.

Computer 104 also typically implements one or more software-based drivers such as driver 208 stored in memory 204 and executable on processor 200 to format document data into a PDL (page description language) such as PostScript or PCL (printer control language) or another appropriate format which it outputs to printer 102. Such device drivers 208 can also be implemented on the specific device they are "driving", such as on printer 102.

In the FIG. 2 embodiment, security module 210 is illustrated as part of driver 208. It is noted that this illustration is not meant as a limitation on the configuration or functionality of security module 210. Rather the illustrated configuration merely facilitates a discussion of the security module 210 as it typically executes in conjunction with driver 208. Therefore, security module 210 might also be a separate module stored separately in memory 204 and executable on processor 200 independent of driver 208. As discussed in greater detail below, security module 210 is configured to generate copy-protected documents 218 using three input files; a document file 212, a recipient list file 214, and a security template file 216.

Printing device 102 has a controller 220 that processes data from host computer 104 for rendering onto a print medium through print engine 228. The controller 220 typically includes a data processing unit or CPU 222, a volatile memory 224 (i.e., RAM), and a nonvolatile memory 226. Nonvolatile memory 226 can include various computer storage media such as ROM, flash memory, a hard disk, a removable floppy disk, a removable optical disk and the like. Nonvolatile memory 226 generally provides storage of computer readable instructions, data structures, program modules and other data for printing device 102. Accordingly, copy-protected documents 218 are illustrated as being stored in memory 226. Copy-protected documents 218 might also be illustrated as residing in volatile memory 224 on a temporary basis either directly from computer 104 or after storage in nonvolatile memory 226.

As mentioned above, security module 210 is configured to generate copy-protected documents 218 using a document file 212, a recipient list file 214, and a security template file 216. The execution of security module 210 is initiated, for example, by a print request received by driver 208 from an application program 206 running on computer 104. Upon receiving a print request, driver 208 typically generates a graphical user interface (not shown) on computer 104 through which the driver 208 presents a user with various print options. Security module 210 is configured to present a copy-protection option to a user through the same or similar graphical user interface. If a user selects the copy-protection option, security module 210 receives an instruction to create copy-protected documents 218.

Security module 210 additionally receives information regarding the three files (i.e., the document 212, the recipient list 214, and the security template 216 files) to be used in creating the copy-protected documents 218. The information received regarding the document 212, the recipient list 214, and the security template 216 files may include file path directions pointing to the files, or it may include the files themselves. Information about the files may be entered by a user through the graphical user interface, or it may be automatically provided to security module 210 once the copy-protection option is selected by a user. For example, once a user selects the copy-protection option, the security module 210 may request the file information through the graphical user interface or it may automatically know where to locate the files.

An example of a document 212 is illustrated in FIG. 3. Document 212 is typically a text and/or graphical document containing information that a user desires to have printed with photocopy protection and distributed to one or more recipients. Document 212 may be a document generated, for example, on a word processing application 206 such as Microsoft® Word.

Figure 4:
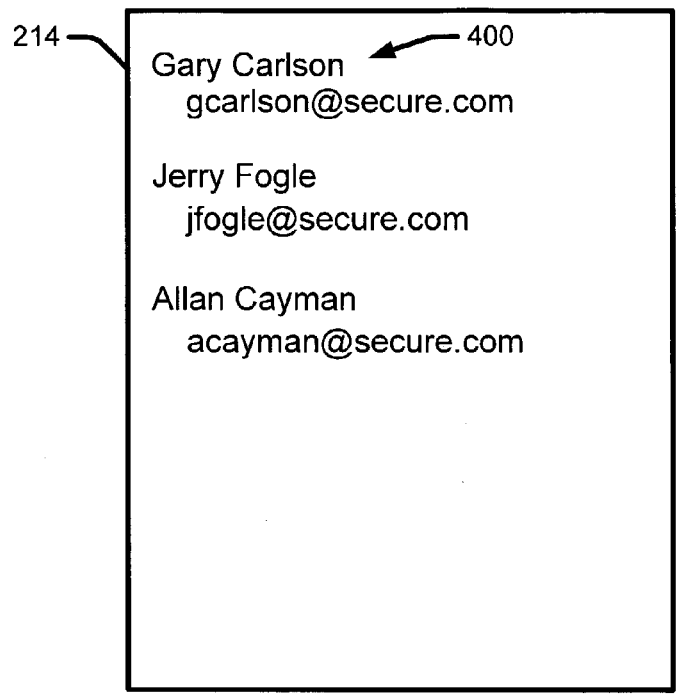
FIG. 4 illustrates an example of a recipient list used in generating a copy-protected document.

An example of a typical recipient list is illustrated in FIG. 4. Recipient list 214 is typically a text file generated in a manner similar to that used to generate a document 212. Recipient list 214 contains a list of names of the people that a user wants to have receive the document 212 as a copy-protected document 218. In one embodiment, a recipient list 214 might also include email addresses associated with each of the recipient names in the list.

Figure 5:
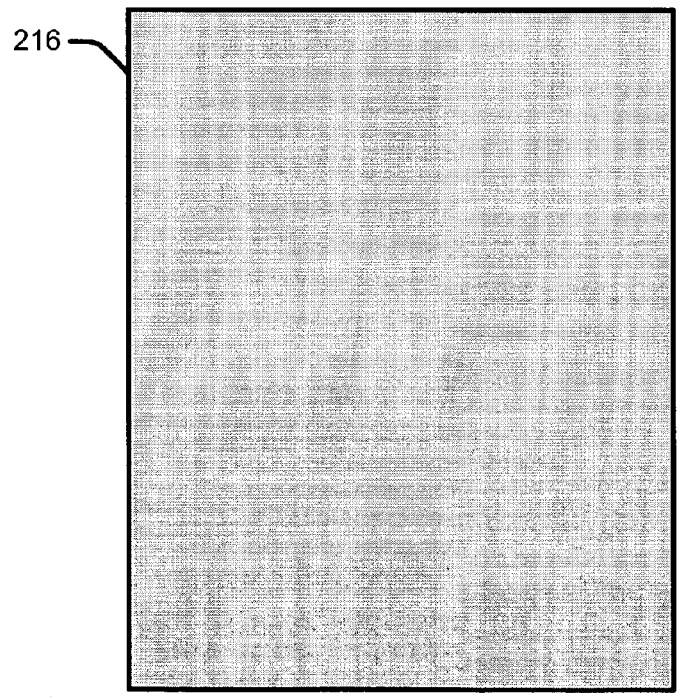
FIG. 5 illustrates an example of a security template used in generating a copy-protected document.

An example of a security template 216 is illustrated in FIG. 5. As originally printed, such a template 216 might appear as a fine printed pattern that makes up a light "gray" background on the paper. This background is typically formed by a pattern of dots, lines, screen structures or the like. Within the background pattern, additional information can be encoded and printed that is mostly hidden by the background pattern when viewed by a casual observer. In conventional security templates, the additional information typically includes a security warning such as the word "VOID" or "COPY" that is made up of a second or "foreground" pattern interspersed within the background pattern. The manner in which the foreground pattern is arranged within the background pattern tends to obscure the security warning. Therefore, the background pattern and security warning on an originally printed template are barely noticeable when viewing an original document containing typical text and/or graphical content. However, when an original document printed on such a template is copied on a photocopier, the security warning becomes prominent on the photocopy such that even a casual observer will notice it. Thus, the original document is easily distinguishable from its copied version by virtue of a warning such as "VOID" or "COPY" being prominently displayed on the copied version.

Figure 6:
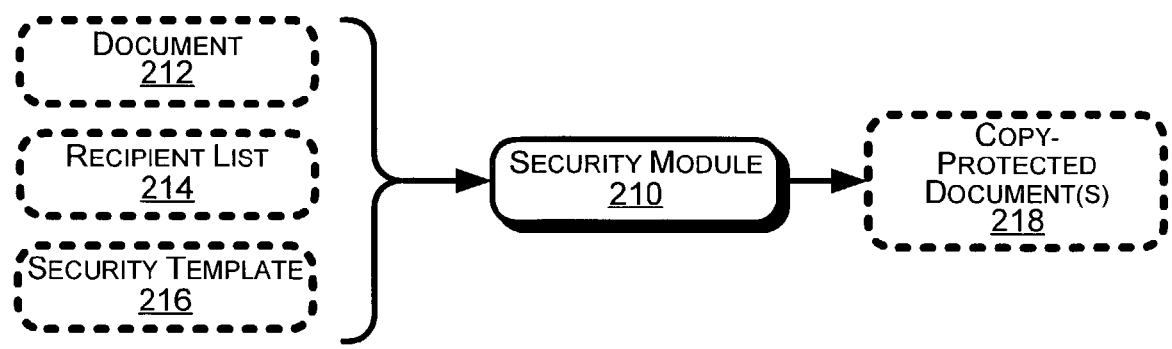
FIG. 6 illustrates a process of integrating a document, a recipient list, and a security template into a copy-protected document.

After receiving information regarding the three input files (i.e., the document 212, the recipient list 214, and the security template 216 files), security module 210 generates one or more copy-protected documents 218. Security module 210 integrates the document file 212, the recipient list file 214, and the security template file 216, to produce a copy-protected document 218 for each recipient name that is present in the recipient list 214. Therefore, the number of copy-protected documents 218 generated equals the number of recipient names in the recipient list 214. FIG. 6 briefly illustrates the process of integrating the three files to generate copy-protected documents 218.

Figure 7:
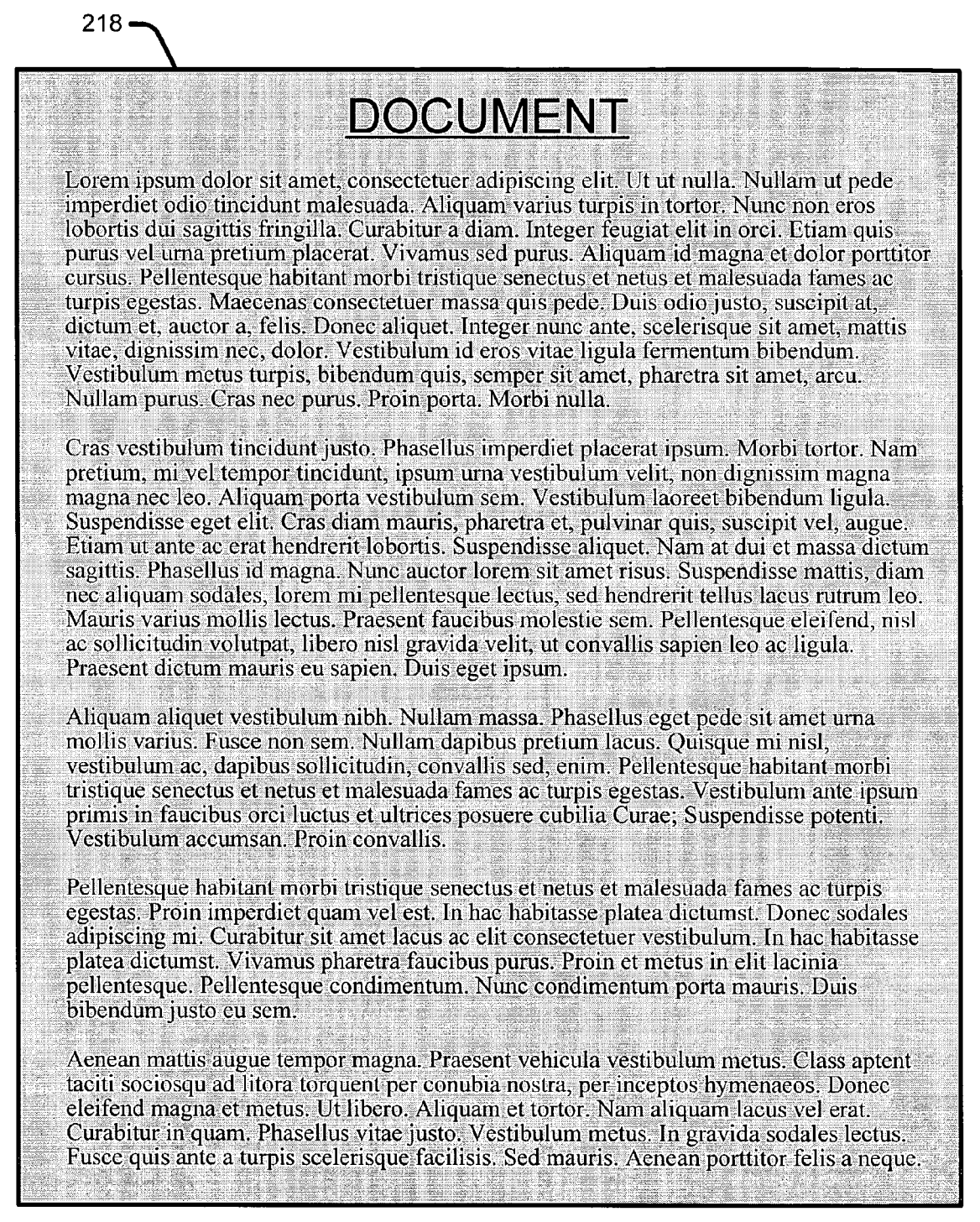

FIG. 7 represents a printed hardcopy of the first of three copy-protected documents 218 that would be generated using the original document 212 of FIG. 3, the recipient list 214 of FIG. 4, and the security template 216 of FIG. 5. Thus, although it is not apparent from the original copy-protected document 218 of FIG. 7, information is encoded in the copy-protected document 218 of FIG. 7 that uniquely identifies the first recipient 400 from the recipient list 214 of FIG. 4 as being the recipient. Furthermore, the encoded information indicates the document is the first of three documents generated and it provides a warning the photocopy is unauthorized. This encoded information is revealed in a photocopied version of the copy-protected document 218 of FIG. 7.

FIG. 8 represents a photocopied version 800 of the copy-protected document 218 of FIG. 7. The encoded information revealed in the photocopy 800 indicates that the photocopy 800 is an "Unauthorized Copy From Gary Carlson" and that the original is the "$1^{st}$ of 3 Originals". Thus, the photocopy 800 reveals the identity of the original recipient (i.e., Gary Carlson 400, FIG. 4) of the original copy-protected document 218. Although not illustrated, photocopies of the other two original copy-protected documents 218 generated from the document 212 of FIG. 3, the recipient list 214 of FIG. 4, and the security template 216 of FIG. 5 would reveal similar information as shown in FIG. 8, except that the information would include the names of the other recipients from the recipient list 214 and indicate that the original documents were $2^{nd}$ and $3^{rd}$ documents from three initial original documents generated. Therefore a distinct copy-protected document 218 is generated for each recipient on a recipient list 214.

After generating the copy-protected documents 218, security module 210 typically transfers the documents 218 to a printer 102 to be printed in hardcopy form. In another embodiment, however, when email addresses are present in a recipient list 214, such as shown in FIG. 4, security module 210 can email each distinct copy-protected document 218 to the recipient email address that corresponds to the recipient in the recipient list 214. The security module 210 may email the documents 218 by initiating a call to an email application program 206 running on computer 104, or it may itself include the capability to email the documents 218.

Figure 9:
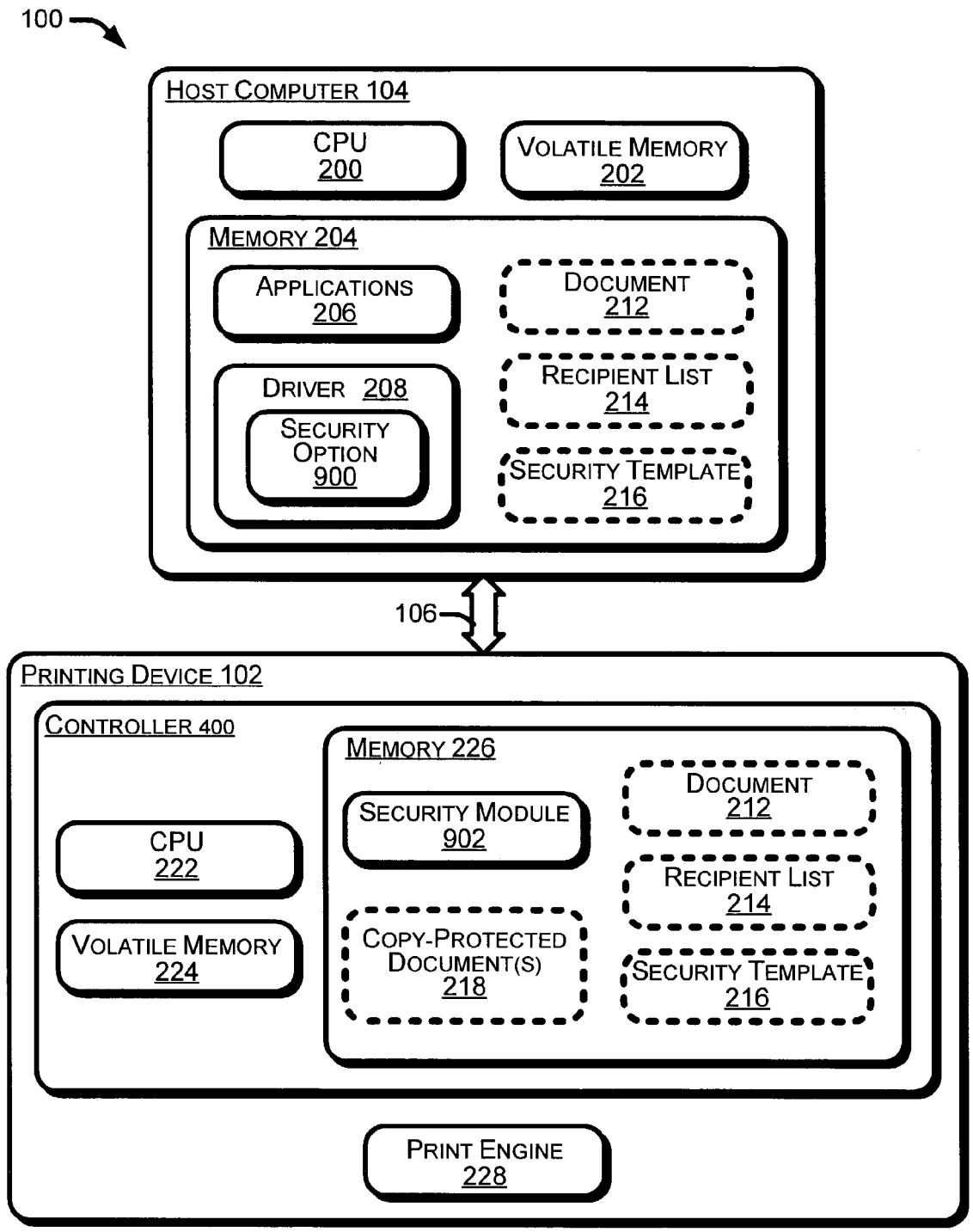
FIG. 9 illustrates a block diagram of another exemplary computer and another exemplary printer as might be implemented to generate copy-protected documents in the environment of FIG. 1.

FIG. 9 illustrates a block diagram of another exemplary computer 104 and another exemplary printer 102 as might be implemented to generate copy-protected documents in the environment 100 of FIG. 1. Computer 104 of FIG. 9 is configured in a similar manner and with the same general functionality as discussed above with respect to the computer 104 of the FIG. 2 embodiment. However, the FIG. 9 embodiment of computer 104 differs in that the security module 210 is no longer present on the computer 104 of FIG. 9. Instead, a security option module 900 is present on computer 104 and stored in memory 204.

Security option module 900 is configured to function in a manner similar to the security module 210 discussed above, except that it is not configured to integrate the three input files (i.e., the document 212, the recipient list 214, and the security template 216 files) and generate copy-protected documents 218. Like security module 210 above, the execution of security option module 900 is initiated by a print request received by driver 208 from an application program 206 running on computer 104. Upon receiving a print request, driver 208 typically generates a graphical user interface (not shown) on computer 104 through which the driver 208 presents a user with various print options. Security option module 900 is configured to present a copy-protection option to a user through the same or similar graphical user interface. If a user selects the copy-protection option, security option module 900 receives an instruction to locate or retrieve a document file 212, a recipient list file 214, and a security template file 216 that it will transfer to printer 102 for generating and printing copy-protected documents 218.

Security option module 900 additionally receives information regarding the document 212, the recipient list 214, and the security template 216 files. The information received regarding the three files may include file path directions pointing to the files, or it may include the files themselves. Information about the files may be entered by a user through the graphical user interface, or it may be automatically provided to security option module 900 once the copy-protection option is selected by a user. For example, once a user selects the copy-protection option, the security option module 900 may request the file information through the graphical user interface or it may automatically know where to locate the files. The security option module 900 accesses the document 212, the recipient list 214, and the security template 216 files and transfers them to the printer 102.

Printer 102 of FIG. 9 is also configured in a similar manner and with the same general functionality as discussed above with respect to the printer 102 in the FIG. 2 embodiment. However, the FIG. 9 embodiment of printer 102 differs in that a security module 902 is now located on the printer 102 in memory 226. Security module 902 is configured to function in a manner similar to the security module 210 discussed above with respect to the FIG. 2 embodiment, except that it does not need to perform the tasks of presenting a copy-protection option and retrieving the document 212, the recipient list 214, and the security template 216 files.

Accordingly, security module 902 is configured to receive the document 212, the recipient list 214, and the security template 216 from computer 104 and to generate one or more copy-protected documents 218. As discussed above with respect to the security module 210 of FIG. 2, the security module 902 integrates the document file 212, the recipient list file 214, and the security template file 216, to produce a copy-protected document 218 for each recipient name that is present in the recipient list 214. The discussion above regarding FIGS. 4, 5, 6, 7, and 8, as well as the Figures themselves, are equally applicable to the embodiments of computer 104 and printer 102 illustrated in FIG. 9. Thus, FIG. 7 represents a printed hardcopy of the first of three copy-protected documents 218 that would be generated by security module 902 using the original document 212 of FIG. 3, the recipient list 214 of FIG. 4, and the security template 216 of FIG. 5. In addition, FIG. 8 represents a photocopied version 800 of the copy-protected document 218 of FIG. 7 generated by security module 902 and printed on printer 102 of FIG. 9.

Exemplary Methods

Example methods for implementing one or more embodiments of a system for generating copy-protected documents 218 will now be described with primary reference to the flow diagram of FIG. 10. The methods apply generally to the exemplary embodiments discussed above with respect to FIGS. 2-9. The elements of the described methods may be performed by any appropriate means including, for example, by hardware logic blocks on an ASIC or by the execution of processor-readable instructions defined on a processor-readable medium.

A "processor-readable medium," as used herein, can be any means that can contain, store, communicate, propagate, or transport instructions for use by or execution by a processor. A processor-readable medium can be, without limitation, an electronic, magnetic, optical, electromagnetic, infrared, or semiconductor system, apparatus, device, or propagation medium. More specific examples of a processor-readable medium include, among others, an electrical connection (electronic) having one or more wires, a portable computer diskette (magnetic), a random access memory (RAM), a read-only memory (ROM), an erasable programmable-read-only memory (EPROM or Flash memory), an optical fiber (optical), and a portable compact disc read-only memory (CDROM) (optical).

Figure 10:
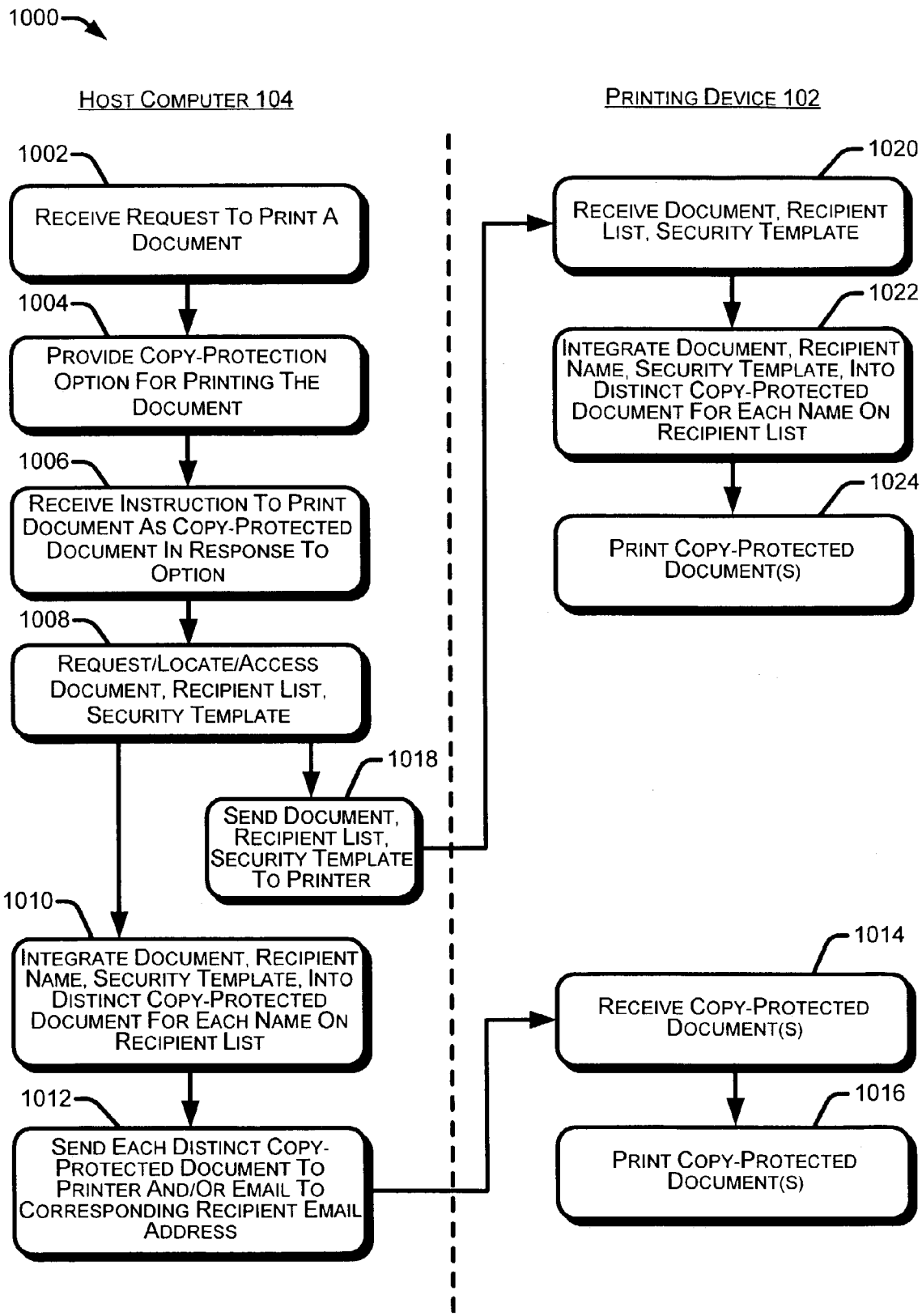
FIG. 10 illustrates a method for implementing one or more embodiments of a system for generating copy-protected documents.

FIG. 10 shows an exemplary method 1000 for implementing an embodiment of a system for generating copy-protected documents 218. At block 1002, a request is received to print a document. The request is typically made from an application program 206 executing on computer 104 and received by a print driver 208. At block 1004, a copy-protection option is provided for printing the document. The copy-protection option is provided by a security module 210 (or security option module 900) associated with the print driver 208 and is typically presented through a graphical user interface generated by the driver 208 on computer 104. At block 1006, the security module 210 (or security option module 900) receives an instruction in response to the copy-protection option to print the document as a copy-protected document. The security module 210 (or security option module 900) then requests or otherwise locates and/or accesses the document 212, a recipient list 214, and a security template 216. Examples of a document 212, a recipient list 214, and a security template 216 are illustrated in FIGS. 3, 4, and 5, respectively, and they are discussed herein above with respect to embodiments of FIGS. 2 and 9.

Depending on the particular embodiment as described above, the method 1000 continues at block 1010 or at block 1018. At block 1010, method 1000 continues with the integration of the document 212, recipient list 214, and security template 216. The integration is performed by security module 210 on computer 104, and includes the incorporation of the document and each recipient name in the recipient list into a security template. Integration of each recipient name from the recipient list into the security template generates a personalized and unique security template into which the document is incorporated. Integration of the document 212, recipient list 214, and security template 216 in this manner generates a distinct copy-protected document 218 for each name in the recipient list.

At block 1012, the copy-protected document(s) 218 are sent to printer 102. In a particular embodiment, a recipient list includes email addresses associated with each recipient name in the recipient list. At block 1012, therefore, security module 210 may also email the copy-protected document(s) 218 to the designated recipients on the list at their corresponding recipient email addresses. At block 1014, the printer receives the copy-protected document(s) 218 and at block 1016, prints the document(s) 218.

In an alternate embodiment, the method 1000 continues from block 1008. At block 1018, the document 212, recipient list 214, and security template 216 are transferred or sent to the printer 102. This occurs after the security option module 900 locates and/or accesses the document 212, recipient list 214, and security template 216 on computer 104 (i.e., at block 1008). At block 1020, the printer 102 receives the document 212, recipient list 214, and security template 216.

At block 1022, a security module 902 on printer 102 integrates the document 212, recipient list 214, and security template 216 in a manner similar to that discussed above with respect to block 1010. Thus, the integration includes the incorporation of the document and each recipient name in the recipient list into a security template. Integration of each recipient name from the recipient list into the security template generates a personalized and unique security template into which the document is incorporated. Integration of the document 212, recipient list 214, and security template 216 in this manner generates a distinct copy-protected document 218 for each name in the recipient list. At block 1024, the copy-protected document(s) 218 are printed by printer 102.

While one or more methods have been disclosed by means of flow diagrams and text associated with the blocks of the flow diagrams, it is to be understood that the blocks do not necessarily have to be performed in the order in which they were presented, and that an alternative order may result in similar advantages. Furthermore, the methods are not exclusive and can be performed alone or in combination with one another.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

The invention claimed is:

1. A processor-readable medium comprising processor-executable instructions configured for:
   receiving a request to print a document;
   providing a copy-protection option for printing the document;
   in response to a selection of the copy-protection option:
      retrieving a document, a recipient list, and a graphical security template; and
      sending the document, the recipient list, and the graphical security template to a printer.

2. A processor-readable medium as recited in claim 1, wherein the graphical security template includes a first pattern interspersed within a second pattern, the graphical security template capable of being personalized by including a data from the recipient list in the first pattern.

3. A processor-readable medium as recited in claim 1, wherein the retrieving further comprises:
   sending a request for a location for each of the document, the recipient list, and the security template.

4. A processor implemented method for copy protecting a document, comprising:
   receiving a request to print a document;
   providing a copy-protection option for printing the document;
   in response to a selection of the copy-protection option:
      retrieving a document, a recipient list, and a graphical security template; and
      sending the document, the recipient list, and the graphical security template to a printer.

5. A method as recited in claim 4, wherein the graphical security template includes a first pattern interspersed within a second pattern, the graphical security template capable of being personalized by including a data from the recipient list in the first pattern.

6. A method as recited in claim 4, wherein the retrieving further comprises:
  sending a request for a location for each of the document, the recipient list, and the graphical security template.

7. A computer comprising:
  one or more processor readable media configured to store a document, a recipient list, and a graphical security template; and
  a security option module configured to provide a copy-protection option for printing the document and to send the document, the recipient list, and the graphical security template to a printer in response to a selection of the copy-protection option.

8. A computer comprising:
  means for receiving a request to print a document;
  means for providing a copy-protection option for printing the document in response to the request to print the document;
  means for, in response to a selection of the copy-protection option, retrieving a document, a recipient list, and a graphical security template in response to the request; and
  means for sending the document, the recipient list, and the graphical security template to a printer.

9. A computer as recited in claim 8, wherein the graphical security template includes a first pattern interspersed within a second pattern, the graphical security template capable of being personalized by including a data from the recipient list in the first pattern.

10. A computer as recited in claim 8, wherein the means for retrieving further comprises:
  means for sending a request for a location for each of the document, the recipient list, and the graphical security template in response to the request to print a copy-protected document.

* * * * *